Figure 1:
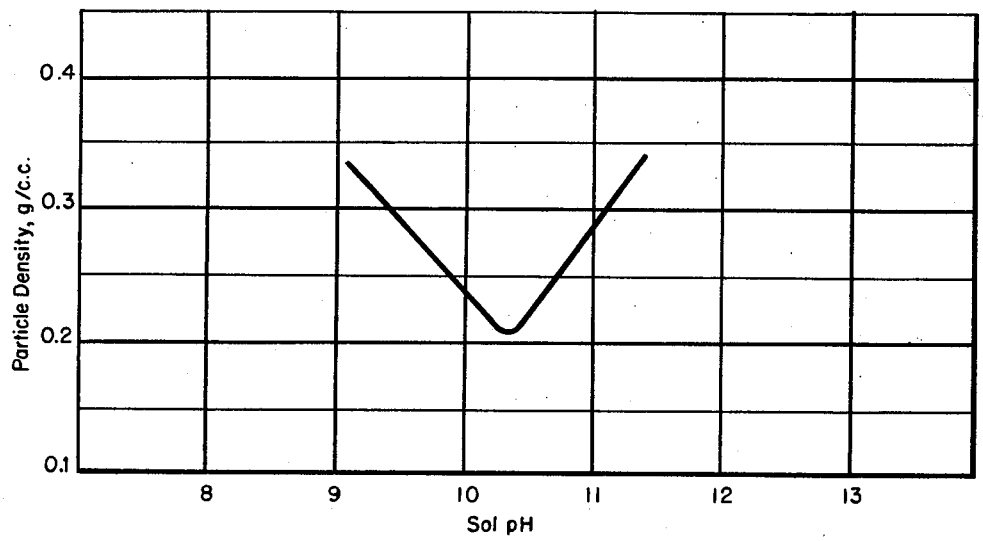

Jan. 12, 1965  A. B. SCHWARTZ  3,165,379
PREPARATION OF SILICEOUS AEROGELS
Filed March 14, 1962

INVENTOR.
Albert B. Schwartz
BY
Raymond W. Barclay
Attorney

3,165,379
PREPARATION OF SILICEOUS AEROGELS
Albert B. Schwartz, Philadelphia, Pa., assignor to Socony Mobil Oil Company, Inc., a corporation of New York
Filed Mar. 14, 1962, Ser. No. 179,742
15 Claims. (Cl. 23—182)

This invention relates to a method for preparing a siliceous gel, one continuous phase of which is a gas, i.e., a siliceous aerogel. More particularly, the present invention is directed to a process for producing aerogels having a solids content consisting essentially of silica by reaction of an alkali metal silicate, in the absence of added acid, with a water-soluble ammonium salt under particularly specified conditions of formation and treatment of the gel product so obtained.

Aerogels have previously been described in certain patents to Kistler, i.e., U.S. 2,093,454 and 2,249,767. In accordance with the disclosure of such patents a silica hydrogel, formed by the action of an acid on sodium silicate consists of a continuous solid phase and a continuous liquid phase. The solid phase consists of a structure of silica fibers with the liquid phase being held between these fibers. If such a gel is dried at normal pressure a very marked shrinkage takes place and the resultant product is a heavy hard glass-like mass. The shrinkage is caused by the formation of a gas-liquid interface within the gel pores during the evaporation of the liquid. Surface tension forces existing at this interface are sufficient to cause the fibers to pull together until the structure is sufficiently compressed to withstand such forces. If the gel is heated under sufficient pressure to provide evaporation within the gel, then no gas phase forms until the critical temperature of the liquid is reached. At this point the liquid phase is converted to the gas phase instantaneously thus avoiding a gas-liquid interface. Once the gas phase has been reached, the gas may be withdrawn without causing any collapse of the solid structure. The resultant product is a light, slightly opalescent solid which may contain as much as 95 percent by volume of air. Since colloidal silica undergoes a change in the presence of water at elevated temperatures resulting in greatly increased particle size, the aqueous phase of the hydrogel is ordinarily replaced with an organic liquid such as ethyl alcohol or ethyl ether before the autoclaving operation. The organic liquid is then removed at a temperature above the critical. At such temperatures no gas-liquid interface is formed and the gel is therefore dried without shrinkage leaving a dried gel of the same volume as the initially formed hydrogel.

The above described process has the disadvantage of being rather expensive since it entails the use of large amounts of organic liquid, a substantial proportion of which generally cannot be recovered. In addition, it is to be noted that silica aerogels usually cannot be produced from silica gels in which the liquid phase consists of water since such gels ordinarily undergo dissolution before the critical temperature is reached.

It has also heretofore been proposed to prepare aerogels in the form of spheroidal particles by initially forming spheroidal particles of hydrogel and replacing the aqueous phase of the hydrogel particles with an organic liquid and thereafter evaporating such organic liquid at a temperature not below its critical temperature. While it is highly advantageous in some instances to prepare aerogels in the form of spheroidal particles, the above-described process has had the same disadvantages as that of the above initially described process, namely of being relatively expensive in necessitating the use of large amounts of organic liquid which generally are not subject to recovery.

In an attempt to overcome the above-noted disadvantages, it has previously been proposed to prepare siliceous aerogels by initially forming a silica hydrogel upon admixture of sodium silicate with a mineral acid at a pH of about 3.5 to 4.5 and permitting the resulting hydrosol to set to a hydrogel. The silica hydrogel so obtained, which is substantially free of metallic cations, is then heated in a pressure resistant vessel without substantially subjecting the gel to a compressive liquid-solid interface to remove the liquid aqueous phase of the gel. While such method is generally less expensive than the above-described process utilizing large amounts of an organic liquid, such method has the disadvantage of requiring the use of acid resistant reacting vessels and of costly high pressure equipment.

It is a major object of the present invention to provide a method for preparing silica-containing aerogels and particularly silica aerogels which are free of the disadvantages present in the above-described previous procedures. It is a further object of this invention to afford an inexpensive method for producing siliceous aerogels. A still further object of the invention is the provision of a commercially attractive method for preparing silica aerogels in the form of spheroidal particles.

The above and other objects which will be apparent to those skilled in the art are realized in accordance with the method of this invention. Broadly stated, the method for preparing siliceous aerogels comprises the reaction of an alkali metal silicate, in the absence of added acid, with a gelling agent of a water-soluble ammonium salt to form a siliceous sol characterized by a pH in the range of about 9.5 to about 11.2 and a silica concentration of between about 80 and about 160 grams $SiO_2$ per liter of hydrosol. Preferably, the aforesaid pH is in the approximate range of 10 to 11 and the hydrosol silica concentration between about 85 and about 135 grams $SiO_2$ per liter. The resulting siliceous hydrosol is permitted to set to a hydrogel upon passage of a suitable interval of time. The resulting hydrogel is thereafter washed free of soluble salts and dried under conditions of substantially atmospheric pressure. The resulting product is a very low density siliceous gel having the characteristics of the above described aerogels, being easily pulverizable and possessing a non-glassy appearance. The product so obtained is useful commercially in such applications as insulation, flatting agents for varnishes, lacquers and enamels, reinforcing agents for plastics and rubber, thickening agents for printing inks, nonskid ingredients in floor waxes, mold lubricants, anti-caking agents in powders and various other applications wherein siliceous aerogels have found use.

The alkali metal silicate reagent used in preparing the siliceous sol in accordance with this process will generally be sodium silicate. However, it is contemplated that other suitable alkali metal silicates may likewise be employed, such as, for example, potassium silicate. The gelling agent utilized in preparation of the siliceous sol is a water-soluble ammonium salt such as, for example, ammonium acetate, ammonium sulfate, ammonium chloride, ammonium carbonate, ammonium fluoride, ammonium bromide, ammonium nitrate and ammonium phosphate.

The quantity of the ammonium salt gelling agent required for sol formation varies with the particular conditions used. However, it has been found essential in accordance with the process of this invention that the ratio of ammonium salt gelling agent to alkali metal silicate be controlled to produce a sol having a pH in the approximate range of 9.5 to 11.2 and preferably in the range of about 10 to about 11. The relative proportions and concentrations of the reagents are further controlled such that the resulting sol has a silica concentration of between about 80 and about 160 and preferably between about 85 and about 135 grams $SiO_2$ per liter of sol. It has been found that the lower concentrations of silica unexpectedly give rise to silica products of actually higher gel density than obtained with sols having a silica concentration within the aforementioned range. It has further been established, as will be evident from data set forth hereinafter, that the sol pH is an important factor and that sols having a pH of less than about 9.5 yield a gel product having a density considerably higher than obtained by controlling the sol pH within the approximate range of 9.5 to 11.2. At a pH greater than about 11.2, the gel time becomes long and the density of the resulting gel is likewise considerably higher than that achieved by controlling the sol pH within the herein specified range of 9.5 to 11.2.

If the above specifications as regards sol pH and silica concentration are followed, the resulting hydrogels are white and opaque and result in a low density gel product characterized by a particle density of less than 0.4 gram/cc. and generally less than 0.3 gram/cc. On the contrary, if the gels are prepared outside the above ranges, the hydrogel will be translucent or clear and will result in a high density product. Particle density, as utilized herein, is the density in grams per cubic centimeter of a single particle, excluding the void space between particles but including internal pore volume. Bulk density, depending on the compactness of the solid particles, will be considerably less than the particle density.

The siliceous hydrogel obtained initially contains zeolitic alkali metal due to the use of the alkali metal silicate reagent employed. Thus, when sodium silicate is the reagent employed, the initially formed siliceous gel will contain zeolitic sodium. Such zeolitic alkali metal may be removed from the siliceous gel by base-exchange, i.e., replacement with hydrogen, ammonium or other metal ion. Such base exchange is not essential in obtaining a low density aerogel product in accordance with the process of this invention. However, removal of zeolitic alkali metal may be desirable or necessary depending on the application of the product. Thus, where the siliceous aerogel product is to be used in catalysis either as a catalyst or as a support for an appropriate catalytic agent, it is generally desirable that the product be free of zeolitic alkali metal. Where it is desirable to modify the chemical composition of the aerogel by the introduction of other metal ions such may be accomplished during replacement of the zeolitic alkali metal with a suitable base-exchange solution containing such other desired metal ion. Where it is not desirable or necessary to introduce another metal ion, the base-exchange solution may be an ammonium salt or an acid.

The resulting siliceous hydrogel, whether or not it has undergone base-exchange treatment, is washed free of water-soluble material. The resulting washed gel is thereafter dried generally in air or steam under conditions of substantially atmospheric pressure. The dried gel may be tempered, if desired, depending on the application of the product. Drying of the hydrogel is generally carried out at a temperature between about 150° F. and about 350° F. until the product is substantially free of moisture. The tempering operation, when utilized, is ordinarily carried out at a temperature between about 350 and about 1400° F. for 1 to 24 hours.

The method of this invention is adaptable for formation of aerogels on a batch basis during which the initial hydrogel is formed in a mass which is subsequently broken up into pieces or particles of desired size. Alternatively, the hydrogel may be initially obtained as spheroidal particles by dropping the sol in the form of globules into a column of water-immiscible liquid so that spheroidal bead-like particles of hydrogel are formed upon gelation.

Thus, in a preferred embodiment of the invention the siliceous sol formed is passed in a finely divided state into a water-immiscible liquid and retained therein until gelation occurs. The siliceous sol prepared in accordance with the present process, having the above specified pH and silica concentration, will not set instantaneously to a gelatinous mass but on the other hand, will set to a hydrogel upon passage of a suitable interval of time. This time differential may be controlled by variation in the solids content of the hydrosol, by variation in the ratio of gelling agent to alkali metal silicate, and by regulation of the temperature of the sol and the water-immiscible liquid into which the hydrosol is introduced. Such time differential permits passing the hydrosol into the water-immiscible liquid so that the sol may assume the desired spheroidal shape and set to a hydrogel during passage through the liquid. When the hydrosol is formed into spheroidal particles employing the above technique, the gelation time is suitably less than 20 seconds.

The solutions of alkali metal silicate and gelling agent used in formation of the present hydrosols are preferably mixed and introduced as globules into the water-immiscible liquid. The water-immiscible liquid may be maintained at an elevated temperature in order to obtain gelation within the desired time. It will accordingly be understood that the time during which the hydrosol and the resulting hydrogel remain in the water-immiscible liquid and the temperature of such liquid are correlated to obtain the desired particles and that these conditions are inversely related so that if the temperature is increased, the time may be decreased.

Generally, hydrogels prepared by the process described herein are characterized by a gelation time of not more than two hours. Although it is to be realized that hydrogels having a longer time of set when desired may also be produced by the present method. The method of this invention is particularly suitable for the production of hydrogels characterized by a time of set in the range of 0.5 to 20 seconds, which hydrogels are capable of being formed into the above-described spheroidal particles upon introducing the hydrosol in the form of globules into a water-immiscible medium and maintaining the hydrosol globules in such medium until they set to globules of hydrogel.

While the water-immiscible liquid in which gelation takes place may have a density higher than the siliceous hydrogel particles in which instance the hydrogel particles rise upwardly through the liquid, such method is ordinarily less preferred than in the case where the liquid has a lower density, allowing the hydrosol to be introduced at the top of a column thereof and the spheroidal hydrogel particles formed therein to descend to the bottom of such column. A particularly suitable water-insoluble medium comprises organic liquids such as kerosene, lubricating oil, gas oils, etc. of such viscosity and density characteristics that the siliceous hydrosol introduced therein in the form of globules will settle at the rate such that the hydrosol undergoes gelation to spheroidal particles of hydrogel during passage through the liquid.

After base-exchange of the initially formed siliceous hydrogel particles, if such has been employed to remove zeolitic alkali metal, the hydrogel particles are water washed free of soluble matter. A particularly satisfactory method for washing the hydrogel is by percolation either by upward or downward flow of water. After washing, the hydrogel particles are dried under conditions of substantially atmospheric pressure at a temperature generally from about 150 to about 350° F. and then if desired, tempered at a temperature of from about 350 to about 1400° F. for 1 to 24 hours or more. Ordinarily, it is preferred to dry the hydrogel particles in air or an atmosphere of superheated steam at a slow rate since such manner of operation has been found to result in less breakage of the gel particles. The tempering operation when employed is ordinarily carried out in air although other inert atmospheres may likewise be used. The particular temperatures chosen for calcination will depend in part on the use to be made of the finished gel. Thus, where the gel is to be employed as an adsorbent, as an insulating material, as a reinforcing agent or thickening agent, it is ordinarily tempered in the approximate range of 350 to 800° F. If, on the other hand, the gel is to be used as a catalyst or catalyst support the temperature of the tempering operation is generally between about 800 and about 1400° F. If desired, the siliceous hydrogel particles may be treated with catalytic components prior to the drying, or drying and tempering operations and the composites so obtained may then be subjected to the above-described drying and tempering.

The following examples will serve to illustrate the method of this invention without limiting the same:

EXAMPLE 1

A silica aerogel in bead form, was prepared from the following reactants:

*Solution A*

Water solution of sodium silicate (N Brand) having an $SiO_2$ to $Na_2O$ weight ratio of 3.22 and a specific gravity at 60° F. of 1.167.

*Solution B*

Water solution of ammonium acetate containing 30 percent by weight of ammonium acetate.

Solution A flowing at a rate of 400 cc. per minute was mixed in a nozzle with Solution B flowing at a rate of 80 cc. per minute. The hydrosol so formed had a silica concentration of 136 grams per liter of sol. The moles of ammonium acetate per mole of $Na_2O$ was 1.01. The hydrosol having a temperature of 43° F. and a pH of 11.0 was introduced into the top of a column of oil as a finely divided stream. The hydrosol so introduced assumed a globular form and set in about 2 seconds to spheroidal particles of hydrogel during passage through the oil column. The resulting hydrogel particles were base-exchanged with an aqueous solution containing 10 percent by weight of ammonium sulfate. The hydrogel particles were thereafter washed with water to remove water-soluble impurities. The hydrogel particles were then dried in superheated steam at 250° F. and subsequently tempered in air for 5 hours at 400° F. The final silica aerogel product in the form of spheroids had a particle density of 0.23 g./cc.

Examples 2–9 were carried out following the general procedure of Example 1. The results of these examples, together with that of Example 1 are set forth below in Table I:

TABLE I

| Example | Reagent | $SiO_2$ Conc., g./l. sol. | Mols Reagent/ Mol $Na_2O$ | Sol Properties | | | Particle Density of Gel Product, g./cc. |
| --- | --- | --- | --- | --- | --- | --- | --- |
| | | | | Temp., °F. | Gel Time, Min. | pH | |
| 1 | Ammonium Acetate | 136 | 1.01 | 43 | 0.033 | 11.0 | 0.23 |
| 2 | do | 109 | 1.26 | 43 | 0.023 | 10.7 | [1] 0.19 |
| 3 | Ammonium Sulfate | 86.3 | 2.21 | 38 | 0.022 | 9.6 | 0.32 |
| 4 | do | 92.8 | 1.88 | 35 | 0.025 | 9.8 | 0.32 |
| 5 | do | 133 | 1.42 | 45 | <0.01 | 10.0 | 0.24 |
| 6 | Ammonium Carbonate | 87.5 | 2.39 | 46 | 0.028 | 9.6 | 0.34 |
| 7 | do | 97.3 | 2.37 | 41 | 0.027 | 9.7 | 0.28 |
| 8 | Ammonium Fluoride | 100 | 3.40 | 44 | <0.01 | 9.8 | 0.30 |
| 9 | do | 113 | 2.40 | 46 | 0.020 | 10.1 | 0.28 |

[1] Real Density=2.11 g./cc.; Surface Area=262 sq. m./g.; Pore Volume=4.8 cc./g.

It will be seen from the foregoing results that ammonium salts generally and specifically ammonium acetate, ammonium sulfate, ammonium carbonate, and ammonium fluoride are suitable gelling agents for use in the method of this invention. In each instance, a low density siliceous aerogel product was obtained.

The series of examples below will serve to illustrate the marked effects of sol pH and silica concentration on the particle density of the aerogel product obtained:

EXAMPLE 10

The following reactants were employed:

*Solution A*

Water solution of sodium silicate (N Brand) having an $SiO_2$ to $Na_2O$ weight ratio of 3.22 and a specific gravity at 60° F. of 1.240.

*Solution B*

Water solution of ammonium acetate containing 60 percent by weight of ammonium acetate.

Solution A flowing at a rate of 215 cc. per minute was mixed in a nozzle with Solution B flowing at a rate of 384 cc. per minute. The hydrosol so formed had a silica concentration of 85.1 grams per liter of sol. The moles of ammonium acetate per mole of $Na_2O$ was 12.9. The hydrosol having a temperature of 42° F. and a pH of 9.0 was allowed to set. The resulting product was base-exchanged with an aqueous solution containing 10 percent by weight of ammonium sulfate. The base-exchanged product was thereafter washed with water to remove water-soluble impurities, dried in superheated steam for 4 hours at 250–300° F. and finally tempered in air at 400° F. for 5 hours. The silica aerogel product had a particle density of 0.34 g./cc.

Examples 11–19 were carried out following the general procedure of Example 10. The results of these examples are set forth below in Table II:

TABLE II

| Example | Reagent | SiO$_2$ Conc., g./l. Sol | Mols Reagent Per Mol Na$_2$O | Sol Temp., °F. | Gel Time, Sec. | Sol, pH | Particle Density Aerogel, g./cc. |
|---|---|---|---|---|---|---|---|
| 10 | Ammonium Acetate | 85.1 | 12.9 | 42 | <0.5 | 9.0 | 0.34 |
| 11 | do | 85.1 | 6.47 | 36 | <0.5 | 9.6 | 0.28 |
| 12 | do | 85.2 | 2.01 | 37 | 0.5 | 10.2 | 0.21 |
| 13 | do | 85.1 | 1.01 | 38 | 21 | 10.9 | 0.27 |
| 14 | do | 85.0 | 0.408 | 36 | (¹) | 11.2 | |
| 15 | do | 85.0 | 0.184 | 36 | (¹) | 11.3 | |
| Effect of Silica Concentration in Hydrosol | | | | | | | |
| 16 | Ammonium Acetate | 125 | 1.01 | 35 | 1.0 | 11.0 | 0.23 |
| 17 | do | 100 | 1.01 | 35 | 2.8 | 11.0 | 0.18 |
| 18 | do | 84.0 | 1.01 | 34 | 14 | 10.9 | 0.27 |
| 19 | do | 67.4 | 1.01 | 34 | 69 | 10.9 | 0.43 |

¹ >3 days.

Figure 2:
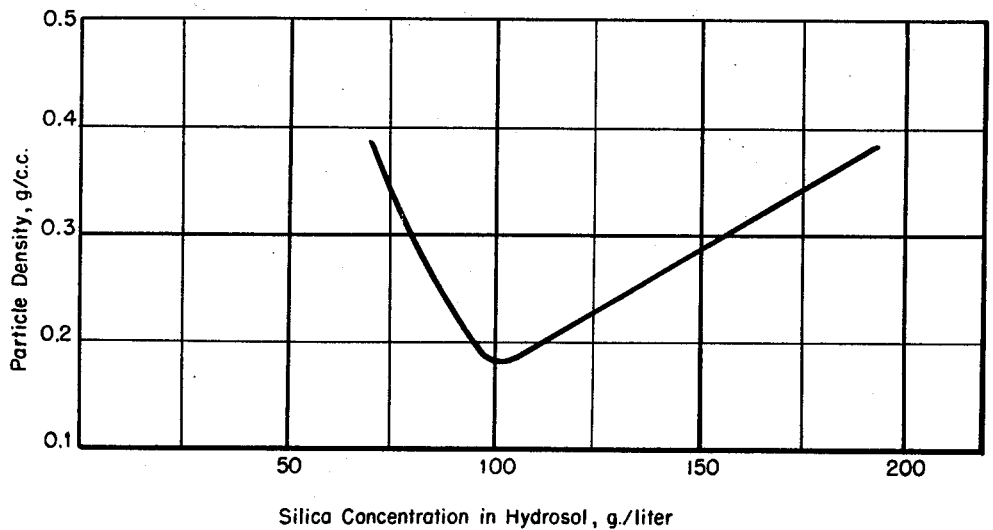

It will be seen from the results of Examples 10–15 that the sol pH had a very marked effect on the density of the gel product. Such effect is particularly evident from a consideration of FIGURE 1 of the drawing where particle density of the gel product is plotted against the pH of the sol. Referring to such figure, it will be immediately apparent that a product of lowest density was obtained at a pH between 9.5 and 11.2 and particularly between 10 and 11. It will further be seen from the results of Examples 16–19 that the silica concentration of the sol likewise had a very noticeable effect on the density of the gel product. This effect is evident from FIGURE 2 of the drawing where particle density of the gel product is plotted against the silica concentration of the hydrosol. Referring to this figure, it will be seen that an unexpected minimum density for the gel product was obtained at a concentration between about 80 and about 160 and preferably between about 85 and about 135 grams of silica per liter of sol at the particular sol pH of about 11. At other sol pH's within the range of 9.5 to 11.2, the minimum density will be achieved at other specified silica concentrations within the approximate range of 80 to 160 grams SiO$_2$ per liter of sol.

EXAMPLES 20–23

A series of aerogels was made in which the hydrogel was base-exchanged with various media. The gel was prepared batch-wise and contained 108 grams SiO$_2$ per liter of sol. The gelling agent employed was ammonium acetate (1 mole ammonium acetate per mole Na$_2$O). The reactants were combined at 43° F. to form a sol having a pH of 11.0 and a gel time of 6 seconds. After base-exchange, the gels were washed, dried and tempered as in the preceding examples. The results obtained are set forth in Table III below:

TABLE III

| Example | Base-Exchange Medium | Particle Density of Tempered Gel, g./cc. |
|---|---|---|
| 20 | None | 0.17 |
| 21 | 10% wt. (NH$_4$)$_2$SO$_4$ | 0.16 |
| 22 | 10% wt. Al$_2$(SO$_4$)$_3$ | 0.18 |
| 23 | 1% wt. H$_2$SO$_4$ | 0.17 |

It will be noted from the results set forth in the above table that base exchange with the various media had little or no effect on the particle density of the final aerogel product.

This application is a continuation-in-part of copending application Serial No. 781,328, filed December 18, 1958. It will be understood that the above description is merely illustrative of preferred embodiments of this invention of which many variations may be made by those skilled in the art within the scope of the following claims without departing from the spirit thereof.

I claim:

1. A method for preparing a siliceous aerogel which comprises reacting an alkali metal silicate, in the absence of added acid, with a gelling agent of a water-soluble ammonium salt, the ratio of said alkali metal silicate to said ammonium salt being such as to form a siliceous hydrosol characterized by a pH in the approximate range of 9.5 to 11.2 and a silica concentration of between about 80 and about 160 grams SiO$_2$ per liter of hydrosol, permitting the resulting hydrosol to set to a hydrogel, washing the hydrogel free of water-soluble matter and drying the resulting product, to thereby form a siliceous aerogel characterized by a particle density not exceeding about 0.3 gram per cubic centimeter.

2. A method for preparing a siliceous aerogel which comprises reacting an alkali metal silicate, in the absence of added acid, with a gelling agent of a water-soluble ammonium salt, the ratio of said alkali metal silicate to said ammonium salt being such as to form a siliceous hydrosol characterized by a pH in the approximate range of 10 to 11 and a silica concentration of between about 85 and about 135 grams SiO$_2$ per liter of hydrosol, permitting the resulting hydrosol to set to a hydrogel, washing the hydrogel free of water-soluble matter and drying the resulting product, to thereby form a siliceous aerogel characterized by a particle density not exceeding about 0.3 gram per cubic centimeter.

3. The method of claim 1 wherein the ammonium salt is ammonium acetate.

4. The method of claim 1 wherein the ammonium salt is ammonium sulfate.

5. The method of claim 1 wherein the ammonium salt is ammonium carbonate.

6. The method of claim 1 wherein the ammonium salt is ammonium fluoride.

7. A method for preparing a siliceous aerogel which comprises reacting an alkali metal silicate, in the absence of added acid, with a gelling agent of a water-soluble ammonium salt, the ratio of said alkali metal silicate to said ammonium salt being such as to form a siliceous hydrosol characterized by a pH in the approximate range of 9.5 to 11.2 and a silica concentration of between about 80 and about 160 grams SiO$_2$ per liter of hydrosol, permitting the resulting hydrosol to set to a hydrogel, washing the hydrogel free of water-soluble matter, drying the product so obtained under conditions of substantially atmospheric pressure at a temperature between about 150 and about 350° F. and tempering the dried product at a temperature of from about 350 to about 1400° F. from 1 to 24 hours, to thereby form a siliceous aerogel characterized by a particle density not exceeding about 0.3 gram per cubic centimeter.

8. A process for forming spheroidal particles of a siliceous aerogel which comprises reacting an alkali metal silicate, in the absence of added acid, with a gelling agent of a water-soluble ammonium salt, the ratio of said alkali metal silicate to said ammonium salt being such as to form a siliceous hydrosol which has a pH in the approximate range of 9.5 to 11.2 and a silica concentration of between about 80 and about 160 grams $SiO_2$ per liter of hydrosol, introducing said hydrosol as a finely divided stream into a water-immiscible medium wherein the hydrosol sets to globules of hydrogel, washing the resulting hydrogel globules free of water-soluble material and drying the resulting product so obtained under conditions of substantially atmospheric pressure, to thereby form a siliceous aerogel characterized by a particle density not exceeding about 0.3 gram per cubic centimeter.

9. A method for preparing spheroidal particles of a siliceous aerogel which comprises reacting sodium silicate, in the absence of added acid, with a gelling agent of a water-soluble ammonium salt, the ratio of said alkali metal silicate to said ammonium salt being such as to form a siliceous hydrogel which has a pH in the approximate range of 10 to 11 and a silica concentration of between about 85 and about 135 grams $SiO_2$ per liter of hydrosol, introducing said hydrosol as a finely divided stream into a water-immiscible medium wherein the hydrosol sets to globules of hydrogel, washing the resulting hydrogel globules free of water-soluble material and drying the resulting product, to thereby form a siliceous aerogel characterized by a particle density not exceeding about 0.3 gram per cubic centimeter.

10. The method of claim 8 wherein the ammonium salt is ammonium acetate.

11. The method of claim 8 wherein the ammonium salt is ammonium sulfate.

12. The method of claim 8 wherein the ammonium salt is ammonium carbonate.

13. The method of claim 8 wherein the ammonium salt is ammonium fluoride.

14. A process for forming spheroidal particles of a silica aerogel which comprises reacting an alkali metal silicate, in the absence of added acid, with a gelling agent of a water-soluble ammonium salt, the ratio of said alkali metal silicate to said ammonium salt being such as to form a siliceous hydrosol which has a time of gelation of less than about 20 seconds, a pH in the approximate range of 9.5 to 11.2 and a silica concentration of between about 80 and about 160 grams $SiO_2$ per liter of hydrosol, introducing said hydrosol as a finely divided stream into a water-immiscible medium wherein the hydrosol sets to globules of hydrogel, washing the resulting hydrogel globules free of water-soluble material, drying the product so obtained under conditions of substantially atmospheric pressure at a temperature between about 150 and about 350° F. and tempering the dried product at a temperature of from about 350 to about 1400° F. for 1 to 24 hours, to thereby form a siliceous aerogel characterized by a particle density not exceeding about 0.3 gram per cubic centimeter.

15. A process for forming spheroidal particles of a silica aerogel which comprises reacting an alkali metal silicate, in the absence of added acid, with a gelling agent of a water-soluble ammonium salt, the ratio of said alkali metal silicate to said ammonium salt being such as to form a siliceous hydrosol which has a time of gelation of less than about 20 seconds, a pH in the approximate range of 10 to 11 and a silica concentration of between about 85 and about 135 grams $SiO_2$ per liter of hydrosol, introducing said hydrosol as a finely divided stream into a water-immiscible medium wherein the hydrosol sets to globules of hydrogel, washing the resulting hydrogel globules free of water-soluble material, drying the product so obtained under conditions of substantially atmospheric pressure at a temperature between about 150 and about 350° F. and tempering the dried product at a temperature of from about 350 to about 1400° F. for 1 to 24 hours, to thereby form a siliceous aerogel characterized by a particle density not exceeding about 0.3 gram per cubic centimeter.

References Cited in the file of this patent
UNITED STATES PATENTS

| | | |
|---|---|---|
| 1,270,093 | Arsem et al. | June 18, 1918 |
| 1,687,919 | Yablick | Oct. 16, 1928 |
| 2,114,123 | Heuser | Apr. 12, 1938 |
| 2,386,810 | Marisic et al. | Oct. 16, 1945 |